US011970384B2

(12) United States Patent
Yu

(10) Patent No.: US 11,970,384 B2
(45) Date of Patent: Apr. 30, 2024

(54) MODULAR DISPENSER STAND

(71) Applicant: Charles Y. Yu, Compoton, CA (US)

(72) Inventor: Charles Y. Yu, Compoton, CA (US)

( * ) Notice: Subject to any disclaimer, the term of this patent is extended or adjusted under 35 U.S.C. 154(b) by 332 days.

(21) Appl. No.: 17/529,183

(22) Filed: Nov. 17, 2021

(65) Prior Publication Data

US 2023/0150809 A1 May 18, 2023

(51) Int. Cl.
*B67D 3/00* (2006.01)
*A47B 73/00* (2006.01)
*A47B 81/00* (2006.01)

(52) U.S. Cl.
CPC ............ *B67D 3/0029* (2013.01); *A47B 73/00* (2013.01); *A47B 81/007* (2013.01); *B67D 3/0083* (2013.01)

(58) Field of Classification Search
CPC .... B67D 3/0029; B67D 3/0083; A47B 73/00; A47B 81/007
See application file for complete search history.

(56) References Cited

U.S. PATENT DOCUMENTS 40,155 A * 10/1863 Billings ................ A47F 5/0018 211/1
1,164,714 A * 12/1915 Gronlund ............... F16M 11/00 248/188
1,740,384 A * 12/1929 Wright ................. B67D 3/0029 141/300
1,791,005 A * 2/1931 Shepard ............... B67D 3/0029 248/152
1,829,353 A * 10/1931 Hogan ................. B67D 3/0083 248/152
2,260,294 A * 10/1941 Brown .................... A47F 7/175 211/44
2,605,071 A * 7/1952 Trepte .................... B65G 65/24 248/142
2,885,090 A * 5/1959 Forman ..................... A47F 7/24 211/175
3,018,898 A * 1/1962 Frazelle ............... F16M 11/046 248/220.43
3,164,351 A * 1/1965 Rembowski ............. A47B 9/14 248/188.5
3,347,575 A * 10/1967 Morris .................... F16B 7/105 403/107
3,771,665 A * 11/1973 Potter ........................ A47F 5/06 211/208
3,771,752 A * 11/1973 Meeh ...................... B65B 67/12 248/101

(Continued)

*Primary Examiner* — Stanton L Krycinski

(57) ABSTRACT

A modular dispenser stand includes a height adjustable frame and a supporting frame. The height adjustable frame includes a plurality of telescopic legs each adapted for selectively adjusting its length, and a leg locker unit provided at each of the telescopic legs to selectively lock up said telescopic leg at a predetermined length, wherein the telescopic legs are spaced apart with each other to define a storage space therewithin. The supporting frame includes an upper support coupled at upper ends of the telescopic legs for supporting a water bottle on the upper support, and a base support detachably coupled at the telescopic legs below the upper support to define the storage space between the upper support and the base support. Accordingly, the telescopic legs are selectively reduced their lengths to drop down the upper support and are selectively increased their lengths to increase the storage space.

4 Claims, 7 Drawing Sheets

(56) References Cited

U.S. PATENT DOCUMENTS

| | | | | | |
|---|---|---|---|---|---|
| 3,864,048 | A * | 2/1975 | Parker | F16B 7/105 | 403/328 |
| 4,085,763 | A * | 4/1978 | Thomas | A61H 3/00 | 403/324 |
| 4,157,801 | A * | 6/1979 | Elmer | B65B 67/12 | 248/101 |
| D260,475 | S * | 9/1981 | Hall | D34/6 | |
| 4,562,983 | A * | 1/1986 | Klefbeck | B65B 67/12 | 248/97 |
| 4,901,959 | A * | 2/1990 | Stage | B65B 67/1205 | 248/101 |
| 5,058,839 | A * | 10/1991 | Stevens | B65B 67/1205 | 248/101 |
| D336,408 | S * | 6/1993 | Tersch | D7/619.1 | |
| 5,370,245 | A * | 12/1994 | Tersch | A47B 73/006 | 211/74 |
| 5,649,656 | A * | 7/1997 | Davy | B60P 3/1025 | 224/532 |
| 5,779,386 | A * | 7/1998 | Eichhorn | F16B 7/0413 | 403/328 |
| 5,784,972 | A * | 7/1998 | Emalfarb | A47G 7/041 | 248/150 |
| 6,349,906 | B1 * | 2/2002 | Anderson | B67D 3/0029 | 248/154 |
| 6,371,686 | B1 * | 4/2002 | Wu | F16B 7/105 | 135/25.1 |
| 6,446,919 | B1 * | 9/2002 | Tsui | B65F 1/1415 | 248/97 |
| 6,454,281 | B1 * | 9/2002 | Pearson | B62B 1/125 | 280/79.5 |
| 6,511,027 | B1 * | 1/2003 | Yu | B67D 3/0029 | 211/74 |
| 6,578,802 | B1 * | 6/2003 | Thier | B67D 3/0029 | 248/146 |
| 6,676,092 | B2 * | 1/2004 | Tsai | B65F 1/1415 | 248/173 |
| 6,776,378 | B1 * | 8/2004 | Yu | A47B 81/007 | 248/176.1 |
| 6,851,563 | B1 * | 2/2005 | Lipari | A47F 7/283 | 211/74 |
| 6,854,916 | B2 * | 2/2005 | Hsieh | F16B 7/105 | 403/109.1 |
| 6,920,834 | B1 * | 7/2005 | Pehta | A47B 9/14 | 248/188.5 |
| 7,284,732 | B1 * | 10/2007 | Lopa | B65F 1/1415 | 248/101 |
| 7,914,016 | B2 * | 3/2011 | Guttormson | B62B 1/264 | 211/74 |
| 8,011,622 | B1 * | 9/2011 | Guthrie | B67D 3/0083 | 224/164 |
| 8,033,289 | B2 * | 10/2011 | Buckley | B63B 17/02 | 135/114 |
| 8,186,284 | B2 * | 5/2012 | Westbrook | A47B 9/20 | 403/109.2 |
| 8,491,215 | B2 * | 7/2013 | Young | B25G 3/18 | 403/109.3 |
| 8,602,425 | B1 * | 12/2013 | Meier, III | B62B 1/264 | 280/47.27 |
| 8,789,836 | B2 * | 7/2014 | Umbro | B62B 1/14 | 280/654 |
| 9,150,234 | B2 * | 10/2015 | Beaver | B62B 1/125 | |
| 9,440,789 | B2 * | 9/2016 | Moayed Sabeti | B65B 67/04 | |
| 9,446,777 | B2 * | 9/2016 | Umbro | B62B 1/06 | |
| 9,586,803 | B1 * | 3/2017 | Snyker | B67D 3/0051 | |
| 9,671,059 | B1 * | 6/2017 | Gabaldon | A47G 23/04 | |
| 10,376,083 | B1 * | 8/2019 | Lee | A47F 7/06 | |
| 11,172,757 | B2 * | 11/2021 | Scharfenkamp | A47B 9/14 | |
| 11,492,247 | B1 * | 11/2022 | Gonzalez | B67D 1/0892 | |
| 2005/0029298 | A1 * | 2/2005 | Sun | B67D 3/0029 | 222/166 |
| 2005/0145760 | A1 * | 7/2005 | Bower | F16M 11/22 | 248/146 |
| 2007/0187435 | A1 * | 8/2007 | Quirk | B67D 3/0083 | 222/481 |
| 2007/0272642 | A1 * | 11/2007 | Baptiste | A47B 43/00 | 211/201 |

* cited by examiner

MODULAR DISPENSER STAND

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a water dispenser, and more particularly to a modular dispenser stand, wherein the modular dispenser stand is customized to adjust the height configuration and the storage configuration according to the user preference.

Description of Related Arts

Many householders prefer to use drinking water from a bottle because it is from a known source. This is wise in many countries foreign to the United States, and many persons carry this cultural preference with them when they come to the United States. Others prefer the flavor of bottled water or require water which is low in sodium or other minerals.

For these and related reasons, bottled water is commonly available in the United States. It is purchased or delivered in large bottles, such as 3-gallon and 5-gallon bottles. Such bottles are difficult to use when it is desired that only a small amount of water be dispensed. Because of this, several dispensing structures are available. One of these dispensing structures is a ceramic jar with a valve and spout on the side thereof. When the jar is filled with water and the valve is opened, the spout issues waters. These ceramic jars are configured to carry one of the large water bottles inverted on the top thereof. Thus, the water bottle dispenses water to the jar, as required, and the jar dispenses water from its valve and spout.

Since deliveries of water bottles are intermittent and since it is desired that a continuous supply be available for dispensing out of the spout, it is common to have on hand extra water bottles. Usually, these extra water bottles stand on the floor adjacent the dispenser. However, in such a position, they are in the way. It is desirable to have a suitable nearby location in which to store extra bottles.

A water dispenser stand is known in the art to support one or more water bottles, wherein the water dispenser stand generally comprises a plurality of vertical legs, an upper support coupled at upper ends of the vertical legs, and a bottom support coupled at bottom portions of the vertical legs. As a result, two water bottles can be supported by the upper and bottom supports respectively. In order to increase the loading capacity of the water dispenser, each of the vertical legs is prolonged, such that a mid-support can be coupled at the vertical legs between the upper and bottom supports to support a third water bottle. However, the water dispenser stand has several drawbacks. Since the upper support is elevated to incorporate with the mid-support, the water bottle must be lifted at a predetermined height to be supported on the upper support. It is a burden for the user to carry and lift the relative heavy water bottle from the ground to the upper support. Furthermore, the water dispenser stand must have a rigid structure in order to support the water bottles, such that the storage shelf will be bulky and heavy. Therefore, it is a hassle for the manufacturers and the users store and carry the water dispenser stand. The water dispenser stand is designed and configured to only support the water bottles, such that no personal decorative element can be added to enhance the overall aesthetic appearance of the water dispenser stand.

SUMMARY OF THE PRESENT INVENTION

The invention is advantageous in that it provides a modular dispenser stand, wherein the modular dispenser stand is customized to adjust the height configuration and the storage configuration according to the user preference.

Another advantage of the invention is to provide a modular dispenser stand, wherein each of the telescopic legs is selectively adjusted its length to elevate the upper support. Therefore, when the telescopic legs are selectively reduced their lengths to drop down the upper support, the user is able to easily lift up a container, such as a water bottle, to be supported on the upper support. Otherwise, when telescopic legs are selectively prolong their lengths to elevate the upper support, a storage space under the upper support is increased for storing an extra container and an used (empty) or unused (water contained) container, or the like.

Another advantage of the invention is to provide a modular dispenser stand, wherein a supporting bracket as an add-on component is detachably coupled at the telescopic legs within the storage space to increase a container loading capacity of the modular dispenser stand.

Another advantage of the invention is to provide a modular dispenser stand, wherein the extra, used or unused container is substantially supported within the storage space in an inclined manner, so as to stably store the container.

Another advantage of the invention is to provide a modular dispenser stand, the height of each of the telescopic legs is further locked up when the supporting bracket is coupled at the telescopic legs so as to prevent the telescopic legs being collapsed accidentally or unintentionally.

Another advantage of the invention is to provide a modular dispenser stand, wherein an inclined base bracket as an add-on component is detachably coupled on the base support to alter the storage configuration of the modular dispenser stand.

Another advantage of the invention is to provide a modular dispenser stand, wherein a ceramic water dispensing jar can be supported on the upper support to receive an inverted container, such that one or more extra containers or other objects can be stored at the storage space under the upper support.

Another advantage of the invention is to provide a modular dispenser stand, which is easily assembled to selectively adjust different height configurations and different storage configurations.

Another advantage of the invention is to provide a modular dispenser stand, which does not involve complicated mechanical process and equipments, and does not significantly alter the original structure of the water dispenser stand and the water dispenser mounted thereabove, so as to minimize the manufacturing and other related cost in producing the water dispenser stand of the present invention.

Another advantage of the invention is to provide a modular dispenser stand, wherein no expensive or complicated structure is required to employ the present invention in order to achieve the above mentioned objectives. Therefore, the present invention successfully provides an economic and efficient solution to provide a rigid frame structure for supporting one or more containers, and to selectively adjust different height configurations and different storage configurations.

Additional advantages and features of the invention will become apparent from the description which follows, and may be realized by means of the instrumentalities and combinations particular point out in the appended claims.

According to the present invention, the foregoing and other objects and advantages are attained by a modular dispenser stand, comprising:

a height adjustable frame which comprises a plurality of telescopic legs each adapted for selectively adjusting its length, and a leg locker unit provided at each of the telescopic legs to selectively lock up the telescopic leg at a predetermined length, wherein the telescopic legs are spaced apart with each other to define a storage space therewithin; and a supporting frame which comprises an upper support coupled at upper ends of the telescopic legs for supporting a container on the upper support, and a base support detachably coupled at the telescopic legs below the upper support to define the storage space between the upper support and the base support, wherein the telescopic legs are selectively reduced their lengths to drop down the upper support and are selectively increased their lengths to increase the storage space between the upper support and the base support.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 1:
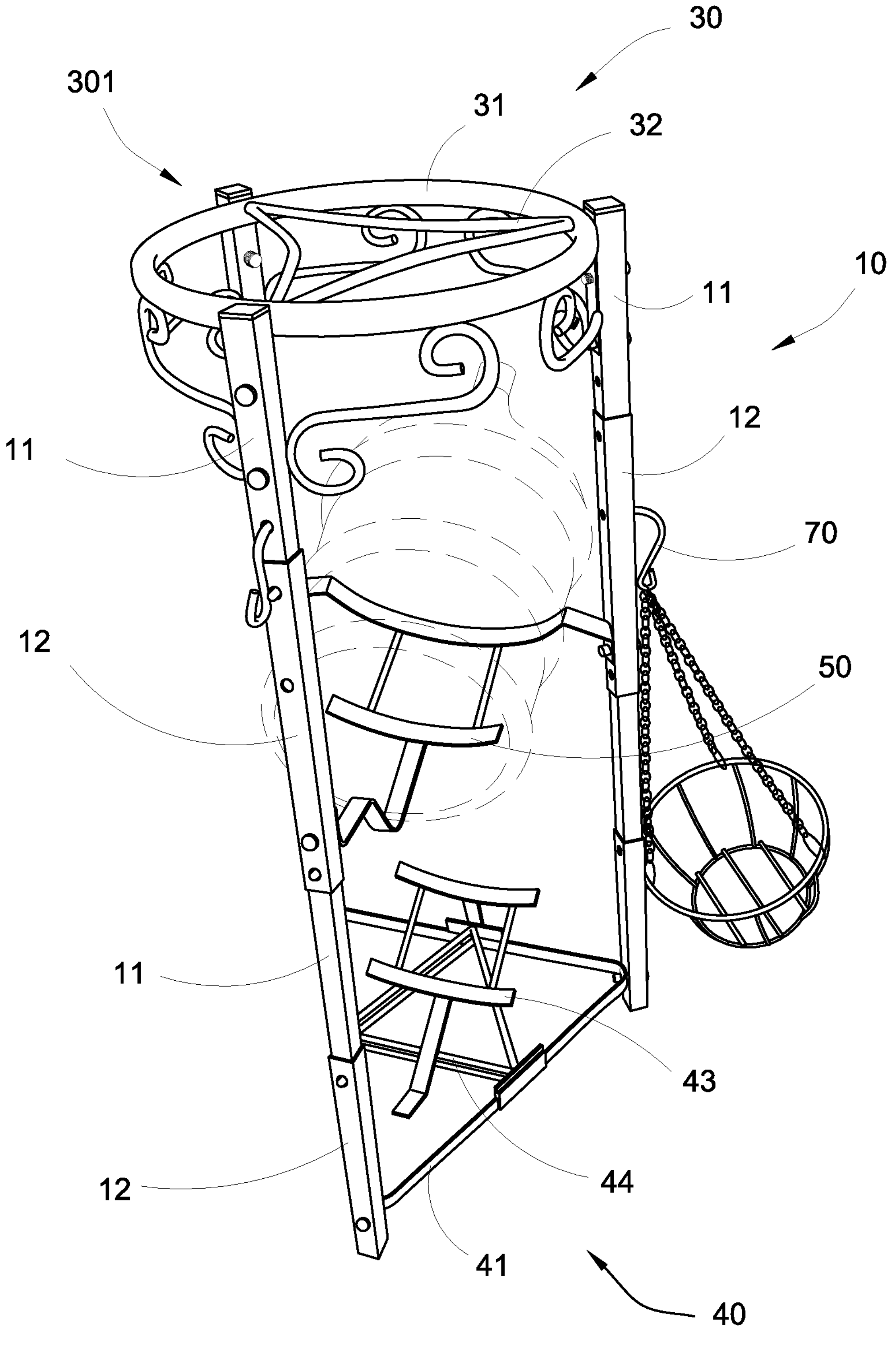
FIG. 1 is a perspective view of a modular dispenser stand according to a preferred embodiment of the present invention.

Referring to FIG. 1 of the drawings, a modular dispenser stand according to a preferred embodiment of the present invention is illustrated, wherein the modular dispenser stand is arranged to support and store one or more objects at different locations of the modular dispenser stand. Particularly, the modular dispenser stand is customized to adjust the height configuration and the storage configuration according to the user preference to support and store the objects. In one example, the modular dispenser stand, which is configured to support and store one or more containers such as water bottles, comprises a height adjustable frame and a supporting frame.

The height adjustable frame comprises a plurality of telescopic legs 10 each adapted for selectively adjusting its length, and a leg locker unit 20 provided at each of the telescopic legs 10 to selectively lock up said telescopic leg at a predetermined length. Accordingly, the telescopic legs 10 are spaced apart with each other to define a storage space 101 therewithin. In one embodiment, the telescopic legs 10 are extended in a vertical manner and are parallel with each other, such that the storage space 100 has a uniform size from top to bottom. Alternatively, the telescopic legs 10 are extended in a vertically and inclinedly extending manner, such that the size of the storage space 100 is gradually reducing from top to bottom. In one embodiment, three telescopic legs 10 are spaced apart with each other to define the storage space 100 within the three telescopic legs 10.

The supporting frame comprises an upper support 30 coupled at upper ends of the telescopic legs 10 for supporting one or more containers, such as water bottle, beverage dispenser, ceramic crock, or the like, on the upper support 30, and a base support 40 detachably coupled at the telescopic legs 10 below the upper support 30 to define the storage space 100 between the upper support 30 and the base support 40. Accordingly, the telescopic legs 10 are selectively reduced their lengths to drop down the upper support 30, such that the container can be easily lifted up for being placed on the upper support 30. Otherwise, the telescopic legs 10 are selectively increased their lengths to increase the storage space 100 for storing extra container, used (empty) container or unused (water contained) container under the upper support 30.

Figure 2:
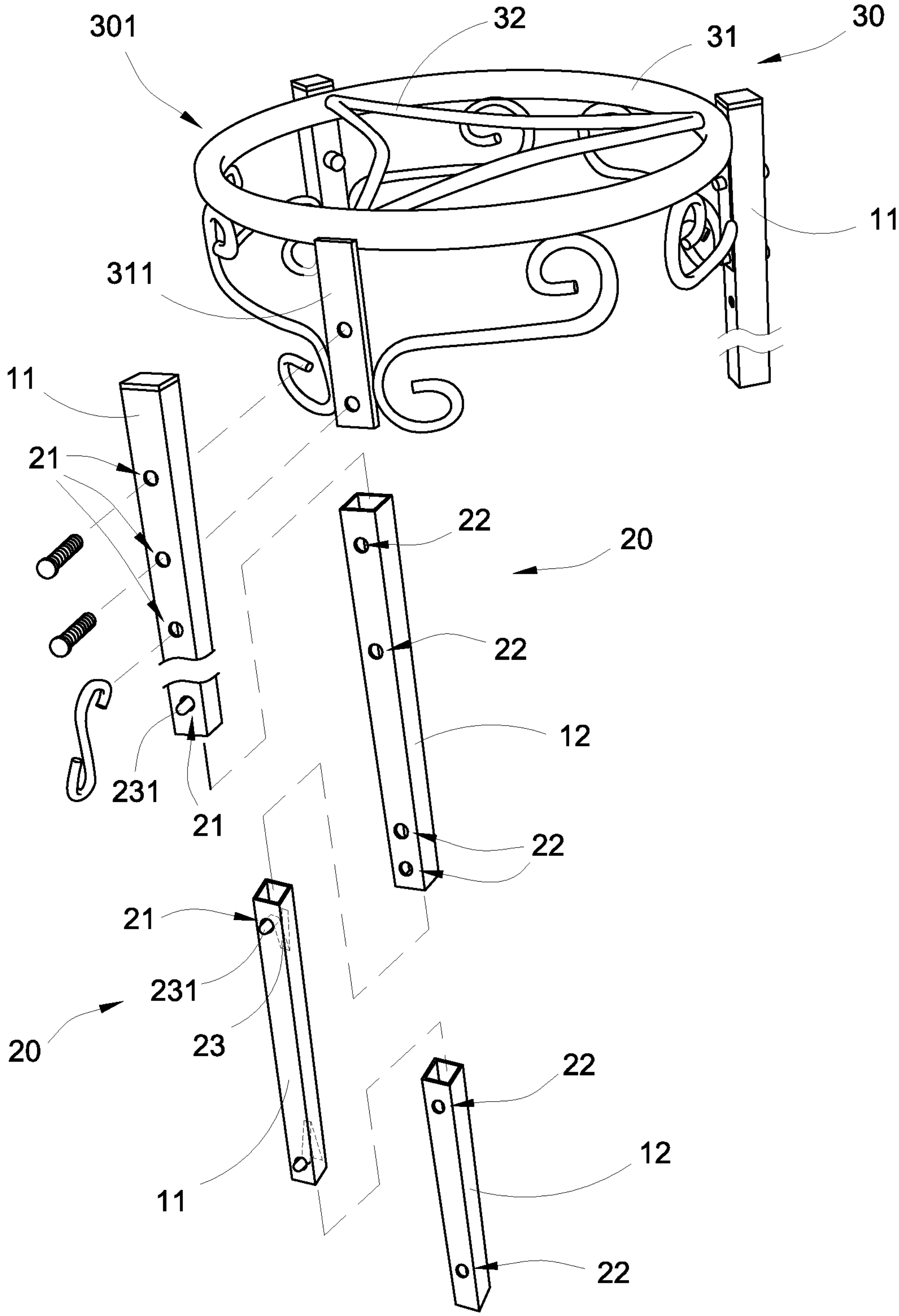
FIG. 2 is an exploded perspective view of a telescopic leg of the modular dispenser stand according to the above preferred embodiment of the present invention.

As shown in FIGS. 1 and 2, each of the telescopic legs 10 comprises one or more first tubular legs 11 and one or more second tubular legs 12 slidably coupling with each other. Accordingly, each of the second tubular legs 12 has a cross sectional size larger than a cross sectional size of the first tubular leg 11, such that the first tubular leg 11 is slidably inserted into the second tubular leg 12 to selectively adjust the length of the telescopic leg 10. In one embodiment, each of the first and second tubular legs 11, 12 has a non-circular cross section, such that when the first tubular leg 11 is slidably inserted into the second tubular leg 12, the first and second tubular legs 11, 12 cannot be rotated with each other. Preferably, each of the first and second tubular legs 11, 12 has a square cross section to prevent any unwanted rotatable movement therebetween. As shown in FIG. 1, each of the telescopic legs 10 is constructed to have two first tubular legs 11 alternating with two second tubular legs 12, wherein one of the first tubular legs 11 is located at the uppermost position of the telescopic leg 10 while one of the second tubular legs 12 is located at the lowermost position of the telescopic leg 10.

According to the preferred embodiment, the leg locker 20 comprises two or more first locking holes 21 spacedly provided at the first tubular leg 11 and two or more second locking holes 22 spacedly provided at the second tubular leg 12, wherein when the first tubular leg 11 is slidably inserted into the second tubular leg 12, at least one of the first locking holes 21 is coaxially aligned with at least one of the second locking holes 22. In one example, two first locking holes 21 are spacedly provided at the first tubular leg 11 and two second locking holes 22 are spacedly provided at the second tubular leg 12. When the first and second tubular legs 11, 12 are slid away from each other at its length prolonging position to extend the length of the telescopic leg 10, only one first locking hole 21 at the lowermost position is coaxially aligned with one second locking hole 22 at the uppermost position. When the first and second tubular legs 11, 12 are slid toward each other at its length reducing position to reduce the length of the telescopic leg 10, only one first locking hole 21 at the uppermost position is coaxially aligned with one second locking hole 22 at the lowermost position. When the first and second tubular legs 11, 12 are slid between the length prolonging position and the length reducing position, the two first locking holes 21 are coaxially aligned with the two second locking holes 22 respectively. Preferably, three or more first locking holes 21 are spacedly provided at the first tubular leg 11 and three or more second locking holes 22 spacedly provided at the second tubular leg 12.

The leg locker 20 further comprises a resilient locking element 23, having a locking head 231, disposed in the first tubular leg 11 at a position that the locking head 231 is protruded out of the first tubular leg 11 from one of the first locking holes 21 to selectively engage with one of the second locking holes 22 so as to selectively lock up the first tubular leg 11 with the second tubular leg 12. Accordingly, the resilient locking element 23 is made of resilient material, such as metal, to provide an outward resilient force at the locking head 231. In order to unlock the first and second tubular legs 11, 12, the locking head 231 is pressed inward, by a user's hand, until the locking head 231 is disengaged with the second locking hole 22, such that the first and second tubular legs 11, 12 are free to slid with each other to selectively adjust the length of the telescopic leg 10. Once the second tubular leg 12 is slid at the first tubular leg 11 until the first locking hole 21 is coaxially aligned with one of the second locking holes 22, the locking head 231 is outwardly pushed to engage with the second locking hole 22 so as to lock up the second tubular leg 12 with the first tubular leg 11 for retaining the length of the telescopic leg 10. For each of the telescopic legs 10 constructed to have two first tubular legs 11 alternating with two second tubular legs 12, three leg lockers 20 are provided at each of the telescopic legs 10.

Figure 3:
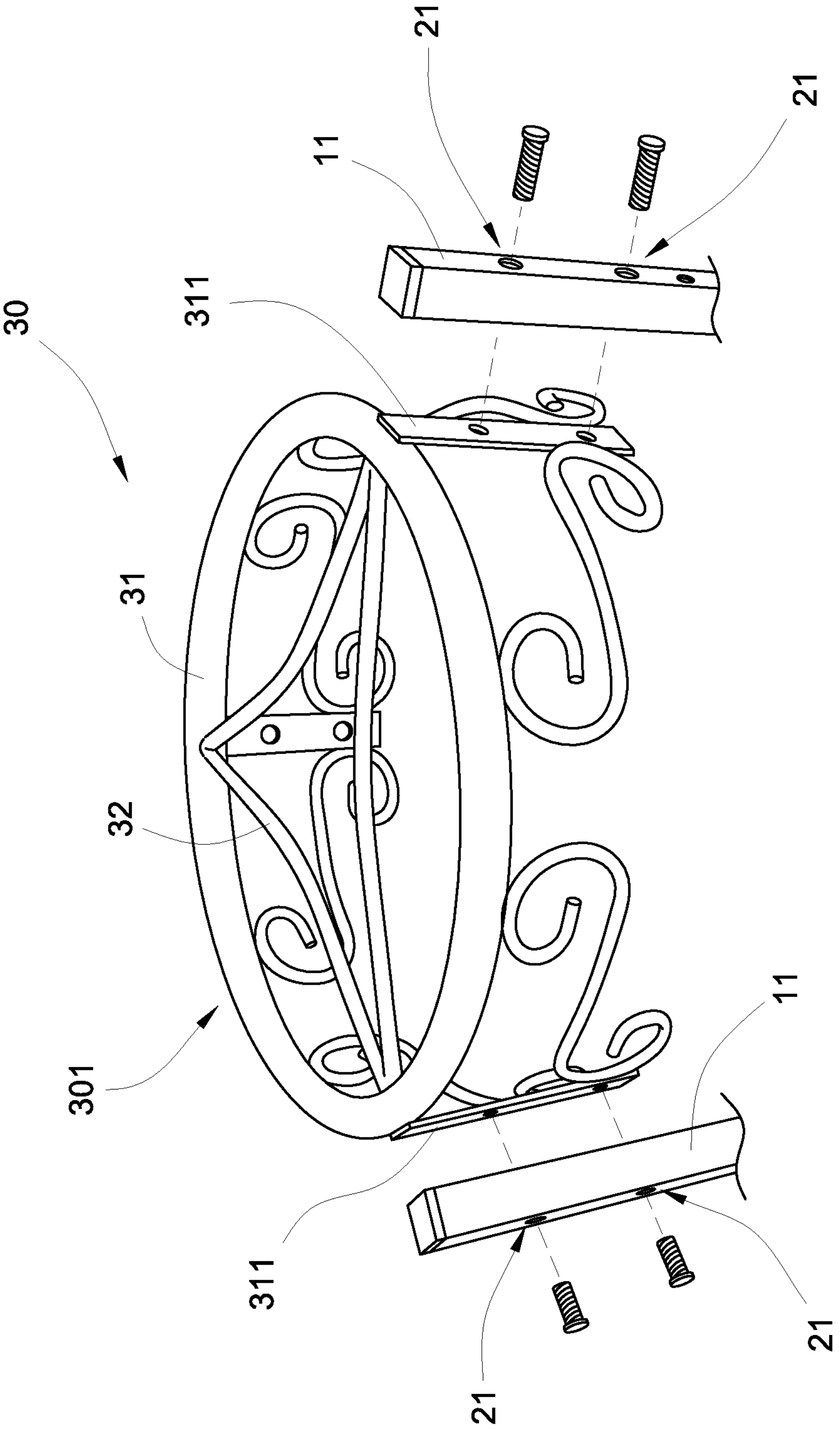
FIG. 3 is an exploded perspective view of an upper support of the modular dispenser stand according to the above preferred embodiment of the present invention.

As shown in FIG. 3, the upper support 30 has a top platform 301 formed at upper ends of the first tubular legs 11 of the telescopic legs 10. Accordingly, the upper support 30 comprises a boundary member 31 detachably coupled at the upper ends of the first tubular legs 11 at inner sides thereof via a plurality of upper support attachments 311, and an inner supporting member 32 extended within the boundary member 31 to define the top platform 301 on the inner supporting member 32. In one embodiment, the boundary member 31, which is embodied and configured to have a ring shape, has an outer circumferential side coupled at the upper ends of the first tubular legs 11, wherein a diameter size of the boundary member 31 is preferred to be equal or larger than a diameter size of the container. It is worth mentioning that when containers are stored in supporting bracket 50 and base bracket 43, the total weight of the modular dispenser stand is increased that the upper support 30 may support item having a diameter or size larger than the diameter of the boundary member 31 while the item is concentrically supported thereon.

For three telescopic legs 10, three upper support attachments 311 are spacedly and downwardly extended from the outer circumferential side of the boundary member 31 to detachably couple at the inner sides of the telescopic legs 10 respectively via fasteners such as bolt and nut. Accordingly, one or more first upper support locking holes are provided at each of the telescopic legs 10 while one or more second support locking holes are provided at each of the upper support attachments 311, such that the fasteners are engaged with the first and second upper support locking holes to detachably couple the upper support 30 at the telescopic legs 10.

The inner supporting member 32 is integrally extended from an inner circumferential side of the boundary member 31 for supporting the container therewithin. In other words, the boundary member 31 serves as a boundary of the top platform 301.

It is worth mentioning that a ceramic water dispensing jar can be supported on the top platform 301 of the upper support 30 to receive an inverted container, such that one or more extra containers or other objects can be stored at the storage space 100 under the upper support 30. Likewise, a plant pot can also be supported on the top platform 301 of the upper support 30.

Figure 4:
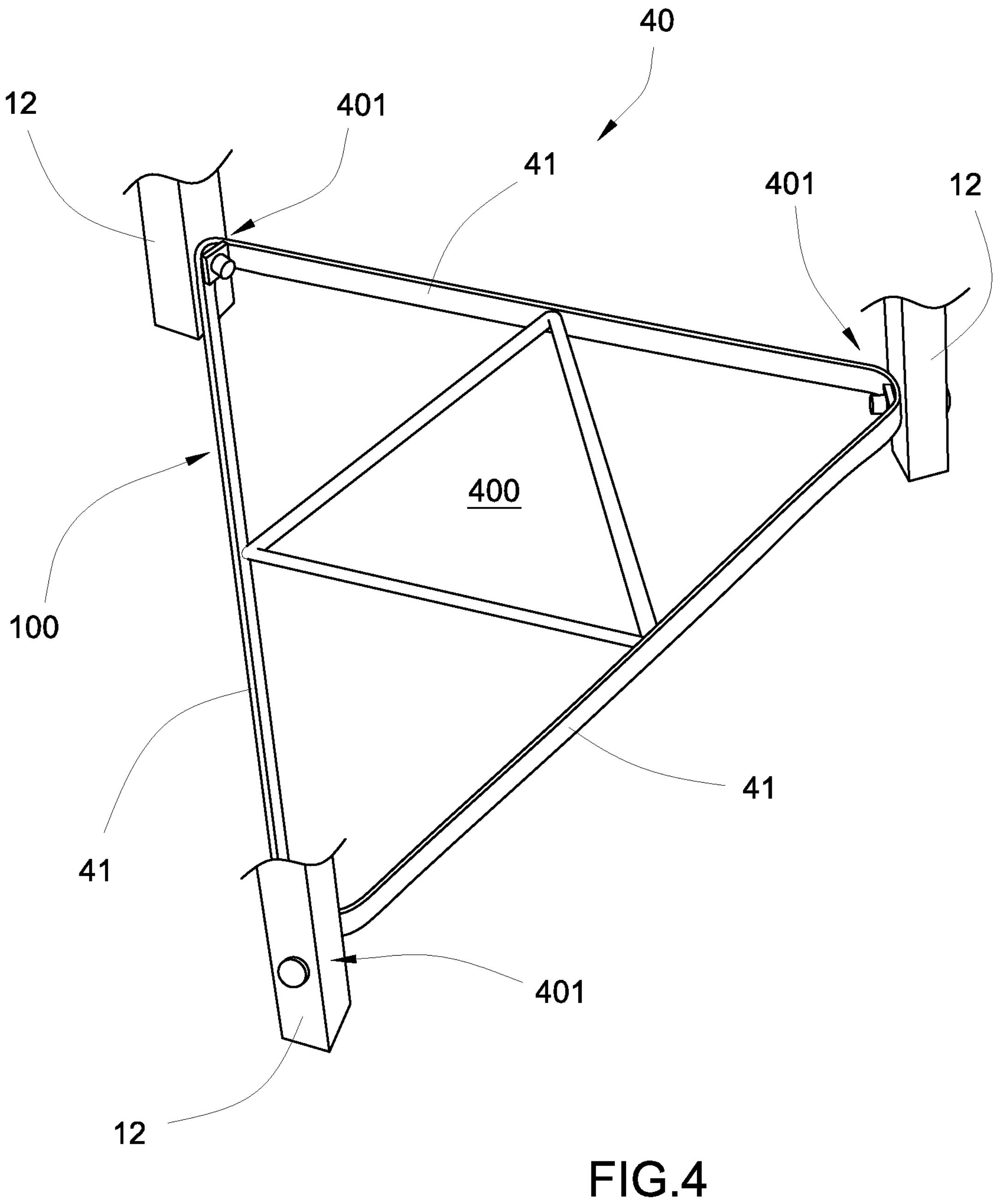
FIG. 4 is a perspective view of a base peripheral frame of the modular dispenser stand according to the above preferred embodiment of the present invention.

As shown in FIG. 4, the base support 40 is detachably coupled at lower portions of the telescopic legs 10 to maximize the storage space 100 between the upper support 30 and the base support 40. In one embodiment, the base support 40 is detachably coupled at the second tubular legs 12 of the telescopic legs 10. The base support 40 comprises a base peripheral frame 41 having a plurality of attaching points 401 detachably coupled at the telescopic legs 10 respectively, and an inner supporting member 42 integrally extended within the base peripheral frame 41 to form a flat base platform 400. The extra, used or unused container can be supported on the flat base platform 400 of the base support 40 and stored in the storage space 100 in a vertical manner. It is worth mentioning that when increasing the lengths of the telescopic legs 10 to increase the storage space 100, any tall object, such as a plant, can be stored in the storage space 100 between the upper support 30 and the base support 40.

Accordingly, the number of attaching points 401 matches with the number of telescopic legs 10. In one embodiment, the base peripheral frame 41 has three attaching points 401 to detachably couple at three telescopic legs 10 respectively. Preferably, the base peripheral frame 41 has a triangular shape defining the attaching points 401 at the corners of the base peripheral frame 41 respectively. Preferably, a first base frame locking hole is provided at the lower portion of each of the telescopic legs 10 and a second base frame locking hole is provided at each attaching point 401 of the base support 40, wherein a fastener, such as bolt and nut, is extended through the first and second base frame locking holes to detachably couple the base support 40 at the telescopic legs 10.

Figure 5:
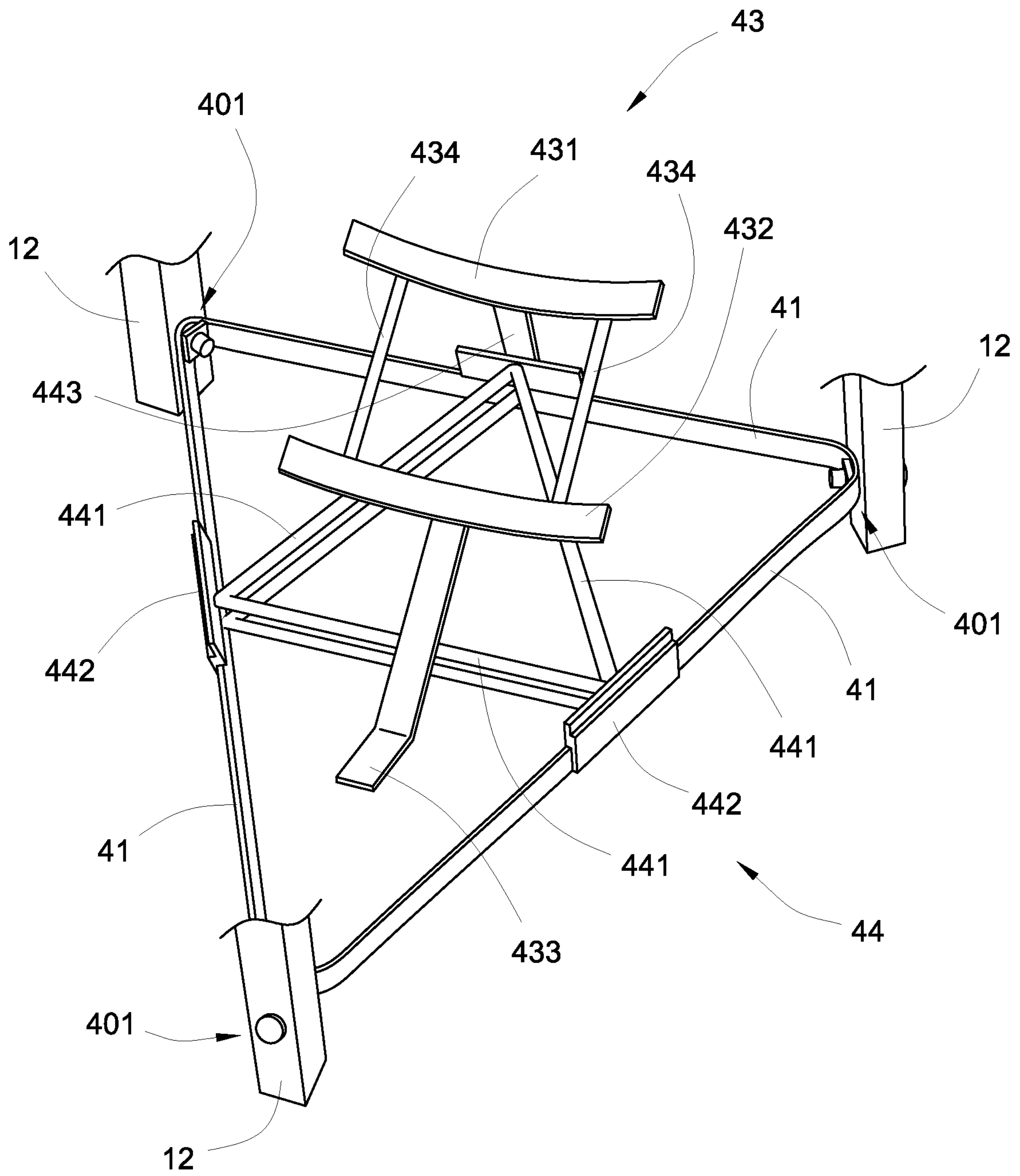
FIG. 5 is a perspective view of an inclined base bracket detachably coupled at the base peripheral frame of the modular dispenser stand according to the above preferred embodiment of the present invention.

As shown in FIG. 5, the base support 40 further comprises an inclined base bracket 43 detachably coupled at the base peripheral frame 41 on the flat base platform 400 for holding the extra, used or unused container in an inclined manner. Accordingly, the modular dispenser stand is able to selectively adjust the storage configuration by selectively coupling the inclined base bracket 43 at the base peripheral frame 41. By detaching the inclined base bracket 43 from the base peripheral frame 41, the object, such as the extra container, can be supported and stored in an upright manner. By coupling the inclined base bracket 43 at the base peripheral frame 41, the object, such as the extra water bottle, can be supported and stored in an inclined manner.

Figure 6:
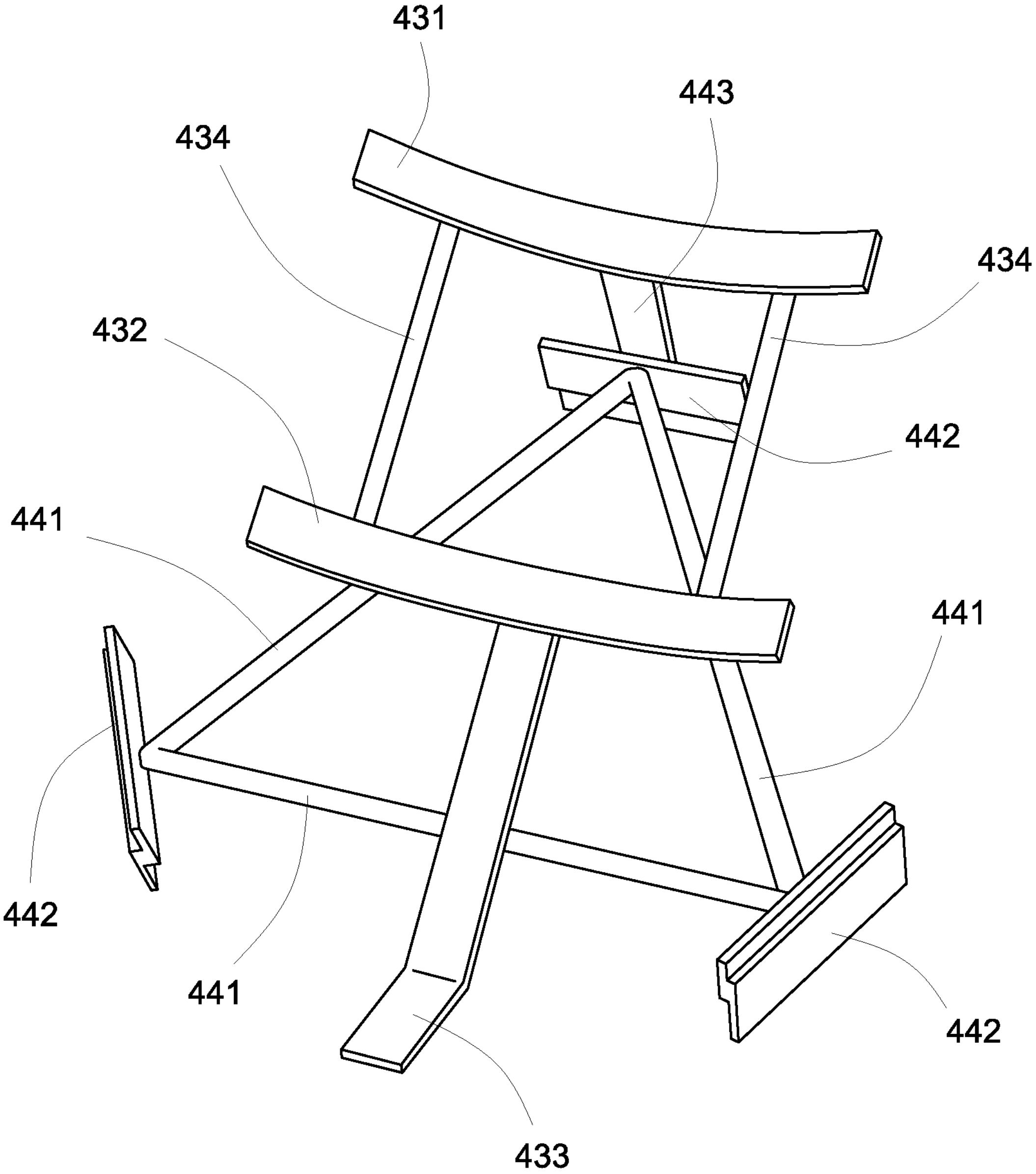
FIG. 6 is a perspective view of the inclined base bracket of the modular dispenser stand according to the above preferred embodiment of the present invention.

As shown in FIG. 6, the inclined base bracket 43 comprises an arc-shaped first base holding arm 431 for holding an upper portion of the container, an arc-shaped second base holding arm 432 spacedly positioned below the first base holding arm 431 for holding a bottom portion of the container, and a base stopper arm 433 extended from the second base holding arm 432 for biasing against a bottom of the container. Therefore, the container is supported by the first and second base holding arms 431, 432 and the base stopper arm 433 in an inclined manner. Preferably, a curvature of each of the first and second base holding arms 431, 432 matches with a curvature of the container to hold the upper and bottom portions of the container respectively. The base stopper arm 433 has a L-shaped configuration to bias against the bottom of the container when the unused container is held by the first and second base holding arms 431, 432.

The inclined base bracket 43 further comprises two base guiding arms 434 extended from the first base holding arm 431 and the second base holding arm 432, wherein the base guiding arms 434 are extended inclinedly to not only connect the first and second base holding arms 431, 432 with each other but also support the container in an inclined manner.

In order to securely couple the inclined base bracket 43 at the base peripheral frame 41, the base support 40 further comprises an adapter frame 44 integrally extended from the inclined base bracket 43 to detachably couple at the base peripheral frame 41. The adapter frame 44 comprises a base supporting member 441 integrally extended from the inclined base bracket 43 and a plurality of attaching members 442 spacedly coupled at the base supporting member 441, wherein the base supporting member 441 is shaped and sized matching with the inner supporting member 42, such that when the base supporting member 441 is supported on the inner supporting member 42, the attaching members 442 are detachably coupled at the base peripheral frame 41 via fasteners, so as to detachably couple the inclined base bracket 43 at the base peripheral frame 41.

Preferably, the adapter frame 44 further comprises a supporting arm 443 integrally and vertically extended between the base supporting member 441 and the inclined base bracket 43. In one embodiment, the first supporting arm 443 is integrally extended between the first base holding arm 431 and the base supporting member 441. The base stopper arm 433 is integrally extended between the second base holding arm 432 and the base supporting member 441. Therefore, the inclined base bracket 43 is inclinedly supported above the base supporting member 441 via the base stopper arm 433 and the supporting arm 443.

Figure 7:
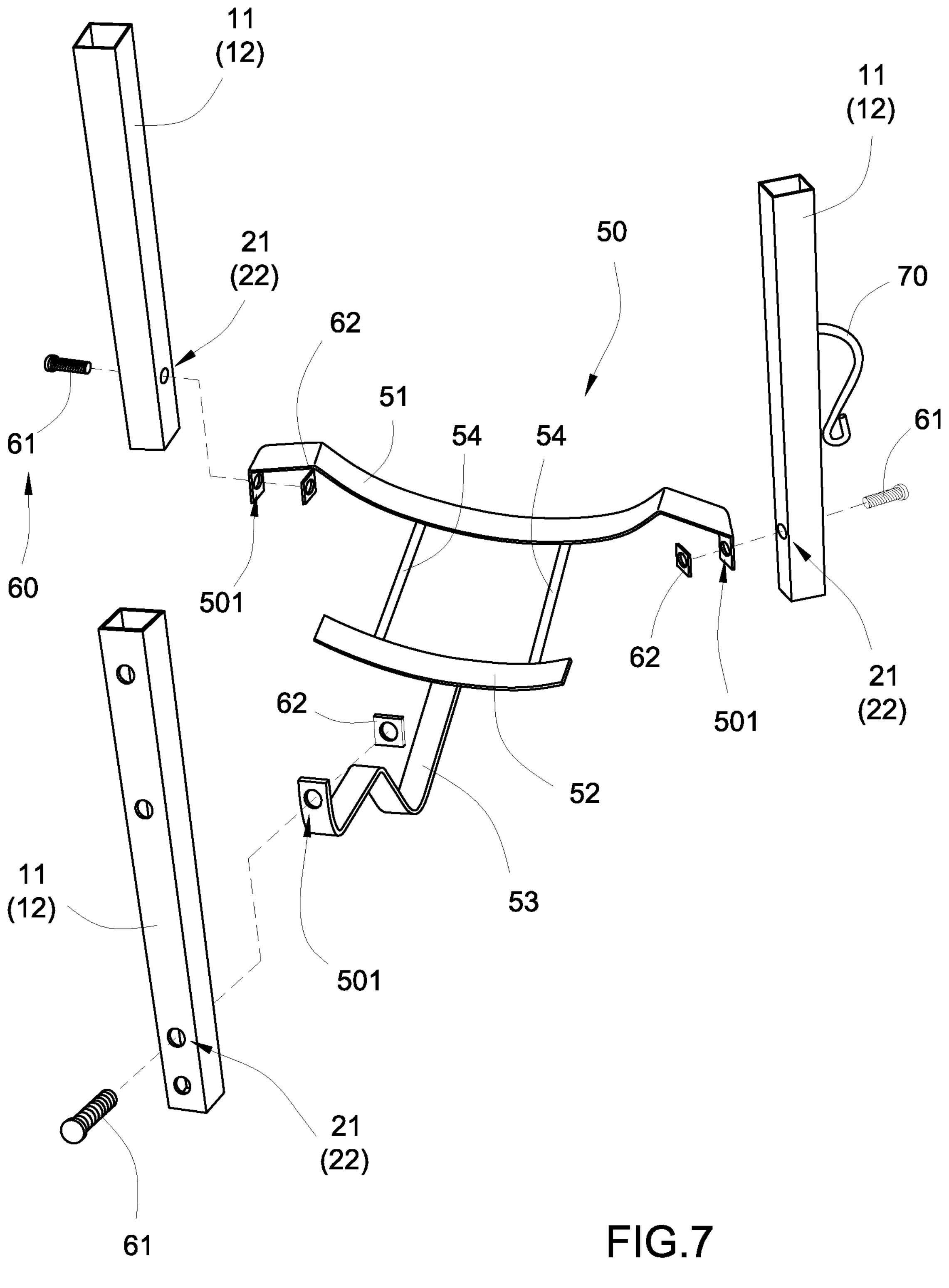
FIG. 7 is an exploded perspective view of a supporting bracket and bracket fasteners of the modular dispenser stand according to the above preferred embodiment of the present invention.

As shown in FIG. 7, the supporting frame further comprises a supporting bracket 50 and a plurality of bracket fasteners 60 detachably coupling the supporting bracket 50 at the telescopic legs 10 between the upper support 30 and the base bracket 40 for holding the container in an inclined manner. In other words, when the inclined base bracket 43 is coupled at the base peripheral frame 41, two containers can be held by the supporting bracket 50 and the inclined base bracket 43 in an inclined manner respectively.

Particularly, the supporting bracket 50 has a plurality of bracket locking holes 501 detachably coupled at the telescopic legs 10 via the bracket fasteners 60 respectively. In other words, each of the bracket fasteners 60 not only detachably couples the supporting bracket 50 at the telescopic legs 10 but also further securely lock up the first tubular leg 11 with the second tubular leg 12. As shown in FIG. 7, the bracket locking holes 501 are configured to align with the first and second locking holes 21, 22, such that the bracket fastener 60 is arranged to engage with the bracket locking hole 501 and the first and second locking holes 21, 22.

The structural configuration of the supporting bracket 50 is similar to the structural configuration of the inclined base bracket 43. As shown in FIG. 7, the supporting bracket 50 comprises an arc-shaped first holding arm 51 for holding the upper portion of the container, an arc-shaped second holding arm 52 spacedly positioned below the first holding arm 51 for holding the bottom portion of the container, and a stopper arm 53 extended from the second holding arm 52 for biasing against the bottom of the container.

The supporting bracket 50 further comprises two guiding arms 54 extended from the first holding arm 51 and the second holding arm 52, wherein the guiding arms 54 are extended inclinedly to not only connect the first and second holding arms 51, 52 with each other but also support the container in an inclined manner.

For three telescopic legs 10, three bracket locking holes 501 are formed at two ends of the first holding arm 51 and a free end of the stopper arm 53 to engage with the telescopic legs 10 respectively. Preferably, a curvature of each of the first and second holding arms 51, 52 matches with a curvature of the container to hold the upper and bottom portions of the container respectively. The stopper arm 53 has a L-shaped configuration to bias against the bottom of the unused container when the container is held by the first and second holding arms 51, 52.

As shown in FIG. 7, the bracket fastener 60 comprises a locking bolt 61 extended through one of the first locking holes 21, one of the second locking holes 22 and one of the bracket locking holes 501, and a locking nut 62 detachably coupled at the locking bolt 61 to lock up the supporting bracket 61, the first tubular leg 11 and the second tubular leg 12 with each other.

It is worth mentioning that one of the first locking holes 21 and one of the second locking holes 22 are being used for the resilient locking element 23 of the leg locker 20 to lock up the first and second tubular legs 11, 12 at a predetermined length. The rest of the first and second locking holes 21, 22 are unused and available for being used by the bracket fastener 60. In other words, the locking bolt 61 is configured to extend through the unused first and second locking holes 21, 22 to the bracket locking hole 501 for detachably coupling the supporting bracket 50 at the telescopic legs 10. Therefore, the height of each of the telescopic legs 10 is further locked up when the supporting bracket 50 is coupled at the telescopic legs 10.

According to the preferred embodiment, the modular dispenser stand may further comprise an accessory holder coupled at one of the telescopic legs 10. In one embodiment, the accessory holder comprises at least one detachable hanger 70 detachably coupled at one of the telescopic legs 10, as shown in FIG. 1. The detachable hanger 70 has a hooking end and an opposed coupling end engaging with one of the first locking holes 21 being unused and one of the second locking hole 22 being unused. In other words, any unused first and second locking holes 21, 22 can be engaged with the detachable hanger 70 for hanging any accessory, such as a basket for plant and etc., or a cup, at the telescopic leg 10.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A modular dispenser stand, comprising:

a height adjustable frame which comprises a plurality of telescopic legs each adapted for selectively adjusting a length thereof, and a leg locker unit provided at each of said telescopic legs to selectively lock up said telescopic leg at a predetermined length, wherein said telescopic legs are spaced apart with each other to define a storage space therewithin; and a supporting frame which comprises an upper support coupled at upper ends of said telescopic legs for supporting a container on said upper support, and a base support detachably coupled at said telescopic legs below said upper support to define said storage space between said upper support and said base support, wherein said telescopic legs are selectively reduced in said lengths thereof to drop down said upper support and are selectively increased in said lengths thereof to increase said storage space between said upper support and said base support, wherein said base support comprises a base peripheral frame having a plurality of attaching points detachably coupled at said telescopic legs respectively, and an inner supporting member integrally extended within said base peripheral frame to form a flat base platform for supporting the container in a vertical manner, wherein said base support further comprises an inclined base bracket detachably coupled at said base peripheral frame on said flat base platform for holding the container in an inclined manner.

2. The modular dispenser stand, as recited in claim 1, wherein said inclined base bracket comprises an arc-shaped first base holding arm for holding an upper portion of the container, an arc-shaped second base holding arm spacedly positioned below said first base holding arm for holding a bottom portion of the container, and a base stopper arm extended from said second base holding arm for biasing against a bottom of the container.

3. A modular dispenser stand, comprising:

a height adjustable frame which comprises a plurality of telescopic legs each adapted for selectively adjusting a length thereof, and a leg locker unit provided at each of said telescopic legs to selectively lock up said telescopic leg at a predetermined length, wherein said telescopic legs are spaced apart with each other to define a storage space therewithin, wherein each of said telescopic legs comprises one or more first tubular legs and one or more second tubular legs having a cross sectional size larger than a cross sectional size of said one or more first tubular leg, such that said one or more first tubular legs are slidably inserted into a respective said one or more second tubular legs to selectively adjust said length of said telescopic leg, wherein said leg locker comprises two or more first locking holes spacedly provided at said one or more first tubular legs, two or more second locking holes spacedly provided at said one or more second tubular legs, and a resilient locking element, having a locking head, disposed in a respective said one or more first tubular legs at a position that said locking head is protruded out of said respective said one or more first tubular legs from one of said two or more first locking holes to selectively engage with one of said two or more second locking holes so as to selectively lock up said one or more first tubular legs with said one or more second tubular legs; and a supporting frame which comprises an upper support coupled at upper ends of said telescopic legs for supporting a container on said upper support, and a base support detachably coupled at said telescopic legs below said upper support to define said storage space between said upper support and said base support, wherein said telescopic legs are selectively reduced in said lengths thereof to drop down said upper support and are selectively increased in said lengths thereof to increase said storage space between said upper support and said base support, wherein said upper support has a top platform formed at upper ends of said first tubular legs of said telescopic legs, wherein said upper support comprises a boundary member detachably coupled at said upper ends of said first tubular legs at inner sides thereof, and an inner supporting member extended within said boundary member to define said top platform on said inner supporting member, wherein said base support comprises a base peripheral frame having a plurality of attaching points detachably coupled at said telescopic legs respectively, and an inner supporting member integrally extended within said base peripheral frame to form a flat base platform for supporting the container in a vertical manner, wherein said base support further comprises an inclined base bracket detachably coupled at said base peripheral frame on said flat base platform for holding the container in an inclined manner, wherein said supporting frame further comprises a supporting bracket and a plurality of bracket fasteners detachably coupling said supporting bracket at said telescopic legs between said upper support and said inclined base bracket for holding a container in an inclined manner, wherein said supporting bracket has a plurality of bracket locking holes detachably coupled at said telescopic legs via said bracket fasteners respectively, wherein each of said bracket fasteners not only detachably couples said supporting bracket at said telescopic legs but also further securely lock up said one or more first tubular legs with said one or more second tubular legs, wherein said bracket fastener comprises a locking bolt extended through one of said first locking holes, one of said second locking holes and one of said bracket locking holes, and a locking nut detachably coupled at said locking bolt to lock up said supporting bracket, said first tubular leg and said second tubular leg with each other, wherein said supporting bracket comprises an arc-shaped first holding arm for holding an upper portion of the container, an arc-shaped second holding arm spacedly positioned below said first holding arm for holding a bottom portion of the container, and a stopper arm extended from said second holding arm for biasing against a bottom of the container, wherein said bracket locking holes are formed at two ends of said first holding arm and a free end of said stopper arm to engage with said telescopic legs respectively.

4. The modular dispenser stand, as recited in claim 3, wherein said inclined base bracket comprises an arc-shaped first base holding arm for holding an upper portion of the container, an arc-shaped second base holding arm spacedly positioned below said first base holding arm for holding a bottom portion of the container, and a base stopper arm extended from said second base holding arm for biasing against a bottom of the container.

* * * * *